Nov. 4, 1952 R. COLOMBO 2,616,125

MANUFACTURE OF PHONOGRAPH AND LIKE SOUND RECORDS

Filed Feb. 19, 1948

INVENTOR

ROBERTO COLOMBO

BY Haseltine Lake & Co.,

AGENTS

Patented Nov. 4, 1952

2,616,125

UNITED STATES PATENT OFFICE 2,616,125

MANUFACTURE OF PHONOGRAPH AND LIKE SOUND RECORDS

Roberto Colombo, Turin, Italy

Application February 19, 1948, Serial No. 9,587
In Italy June 14, 1945

Section 1, Public Law 690, August 8, 1946
Patent expires June 14, 1965

1 Claim. (Cl. 18—5.3)

This invention relates to a method and an apparatus for the manufacture of gramophone sound records or discs.

Gramophone and like sound records are generally moulded from a composition containing gum lac or other natural or artificial resins, the final product being in every case stiff and brittle. Attempts have been made to obviate this drawback by manufacturing cardboard records, the grooves being formed in a thin coating consisting of gum lac or other artificial or natural resins.

Attempts have also been made to manufacture gramophone and like sound records from synthetic resins without, however, obtaining satisfactory results.

The object of this invention is the manufacture of gramophone or like sound records from artificial resins of the cellulosic type or of the type that may be polymerised or polycondensed, by which products are obtained that are far superior to the records known heretofore both from the acoustic and mechanical standpoint as well as in appearance.

The records according to this invention are improved as regards freedom from "scratch" and ease of sliding of the needle, so that life of the record is considerably improved and frequent replacement of the needle, as in ordinary gramophones, is no longer required. Reduction of "scratch" is of the utmost importance, since it enables more faithful reproduction of sounds and gives a mellow tone, eliminating the characteristics metallic noise which causes harshness of high-pitched voices or sounds.

As distinct from gramophone records at present in use, which are extremely brittle, the records according to the invention are practically unbreakable, which is advantageous in transporting and handling the record.

The discs are non-inflammable and are merely liable to carbonise at very high temperatures, without propagating flame.

Their specific weight is about 1.1 to 1.4, which is a considerable advantage with respect to the material employed heretofore.

On account of the superior mechanical properties of the material employed, it is possible to reduce considerably the thickness of the records, which results in reduced weight and clumsiness, while the records are highly flexible and elastic.

By the process according to this invention it is possible to manufacture records of any colour and shade, even in different colours on both sides, so that editors may utilise different colours to identify different classes of records. Finally, different colours may be used in suitable distribution on a disc side for various purposes, such as the exact adjustment of the speed of rotation as required for a satisfactory sound reproduction, by forming an annulus of complementary alternating colours of suitable angular width, said angular width being calculated in manufacture to give at exactly the proper speed for reproducing the sound from the record a white colour effect from the complementary colours, so that the individual colours are no longer visible to the eye.

The central portion of the disc may be made of transparent material and the label may be incorporated therein, or the transparent portion may be larger than the region presently covered by the label, and inscriptions relating to the disc may be impressed thereon, for instance the words of the song corresponding to the recorded music, or the like, said inscriptions being printed on a sheet incorporated in the transparent disc material, while the sound groove may be utilised as usually up to the central portion or, if necessary, even further, as the sound groove on the transparent material does not disturb visibility of the underlying label incorporated in the disc and, vice versa, the label does not prevent impressing the sound record on a disc portion over the label.

According to this invention the synthetic resin compositions, either suitable for polymerisation or polycondensation or of the cellulosic type, may be varied within very wide limits and have admixed thereto materials adapted to improve the mechanical and acoustic properties of the records, more particularly, by the addition of graphite or talc "scratching" of the disc is reduced and sliding of the needle in the sound track is improved, which results in a longer life of both record and needle. Talc is used more particularly when light coloured discs are desired.

According to this invention, the disc is not formed simultaneously to impression of the sound record, the sound groove being impressed in a blank cut from a ribbon. The ribbon or plate from which the blank to be impressed is cut, should be perfect both as regards surface conditions and homogeneousness of structure.

The above results are satisfactorily obtained according to the invention by employing an extrusion press as described in Italian Patent No. 370,578, by which a perfectly homogeneous mass is extruded without the use of solvents through a die opening in the form of an annular slot, delivering a tube that is cut, as it issues from the die opening, to form a ribbon in accordance with Italian Patent No. 400,706. The ribbon is smoothed and uniformly drawn and stamped so as to cut therefrom blanks that are successively provided with the sound track, the waste material being cut to pieces and returned to the press, so that the material is utilised in full, without being subject to losses or alterations of any kind.

The invention will now be more particularly described with reference to the accompanying drawings, which shows diagrammatically the features of the record and the process of its manufacture.

Figures 1, 2, 3, 4, 5, 6, 7, 8, 9, 10, 11, 12:
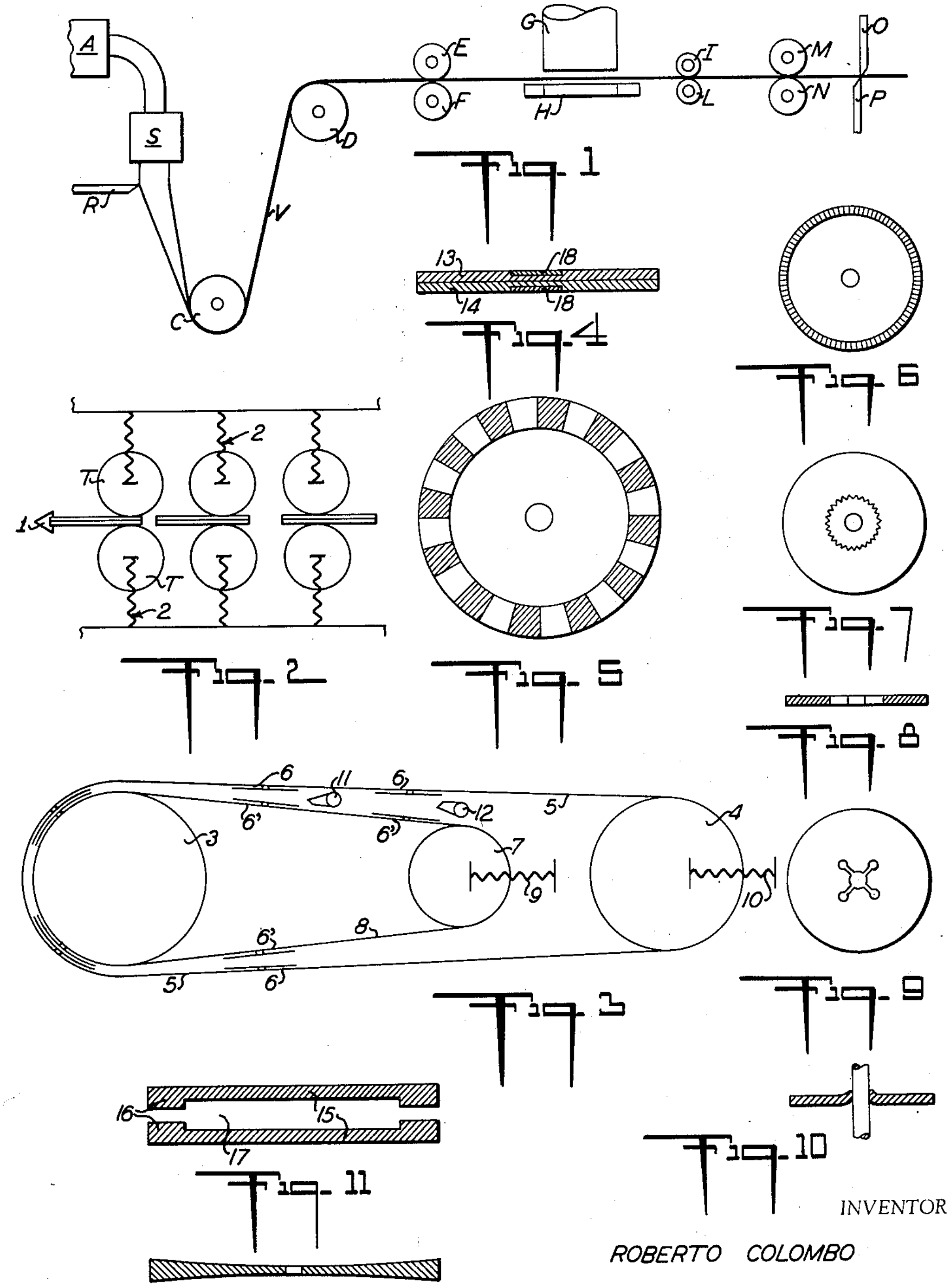
Figure 1 shows diagrammatically the process for manufacturing sound record blanks, in which the waste material is re-utilised.
Figure 2 shows diagrammatically the process of impressing the sound track on the blanks.
Figure 3 shows a modification of the impressing method, adapted to increase the output when flexible matrices are used instead of rigid ones as in Figure 2.
Figure 4 is a sectional view of a disc differing in colour on both sides, with the label incorporated therein.
Figure 5 is a plan view of a disc provided at its periphery with an annulus divided into sectors of alternating complementary colours, having an angular width such as to give the white colour effect from the annulus only when the record rotates at the optimum speed for satisfactory sound reproduction.
Figure 6 is a plan view of a disc with a milled edge for increasing adherence and preventing slipping on the turntable during reproduction, when very thin and light records are used as is made possible by the material according to this invention.
Figures 7 and 8 show a plan view and a diagrammatical sectional view, respectively, of a record provided with a resilient central washer for the same purpose as described with reference to Figure 6.
Figures 9 and 10 are similar views of a disc provided with a central bore and tongues for improving adhesion to the turntable spindle, again in order to prevent slipping of the record with respect to the turntable when the form is very thin and light.
Figure 11 is a cross sectional view of a matrix the two parts of which are incorporated with the mould.
Figure 12 is a sectional view of a disc gradually increasing in thickness from the centre towards its periphery to prevent distortion with changes in temperature. The total increase in thickness amounts practically only to a few tenths of a millimeter.

Referring to Figure 1, which relates to the manufacture of records by stamping in one step direct from the raw material comprising the resin, A denotes an extrusion press of the kind described in Italian Patent No. 370,578 by which a perfectly homogeneous mixture is obtained without using solvents, S denotes the die opening in the form of an annular slot, the tube issuing therefrom being cut immediately past said opening by a knife R as described in Italian Patent No. 400,706 so as to form a strip V which is spread out and flattened by passing it over rollers C and D. The resulting strip is evened between the rotating heated rollers E and F, so that the strip is uniformly drawn, whereupon it travels through another pair of drawing rollers I and L. A press of any suitable type for cutting the blanks is interposed between the roller pairs E—F and I—L. The drawing diagrammatically shows the punch G and die H which cut the blanks at determined intervals and by performing a suitable motion, so as to utilise most of the material available. The strip from which the blanks have been cut, constituting the waste material, travels past the roller pair I—L between cutting rollers M and N, which subdivide it into narrow longitudinal strips, and underneath a cutter of which the blades O and P cut the strips in a transverse direction. The resulting squares or rectangles may be supplied to the extrusion press A and re-utilised. In this manner any impurity is kept away from the raw material for manufacturing the strip and waste material is re-utilised.

The sound track is impressed by pressing the record blank between matrices in a hydraulic or mechanical press.

As the material is generally thermoplastic; it should be heated to its softening temperature and then cooled as it is pressed in the die until it reaches a temperature at which it is restored to its desired mechanical properties and the sound track is of a permanent nature. According to the invention, matrices may be used that will serve at the same time as dies (Figure 11), which is convenient from the standpoint of cost of manufacture. 15 denotes the matrix side carrying the sound track; 16 denotes both sides of the disc. The blank is placed between said parts in the corresponding chamber 17 for impressing the desired sound track thereon, when a suitable pressure is exerted on the die.

The invention enables recording to be effected in a quicker and more economical manner, as shown in Figure 2. 1 denotes the pairs of matrices between which the blanks are brought. The matrices are moved between pairs of rollers T which are pressed against the matrices by strong springs 2.

The rollers T are heated on the first portion of the path therebetween and cooled on the remaining portion.

As will be obvious, on travelling over the first set of heated rollers, the die and the record blank therein are heated to the desired temperature for impression while, as they travel over the next pairs of cooled rollers T, the material resumes room temperature or nearly so, the record track becomes durable and the impressed record may be withdrawn from the die. Endless bands may be employed instead of a succession of pairs of rollers, and the bands may be pressed by spring rollers, pressure being transmitted to the dies as they travel through the bands. It is possible to employ a pair of heated bands and a successive pair of cooled bands between which the dies are passed.

By this process recording is effected in a short time by using simple and inexpensive means.

When very thin and flexible matrices are available, which are apt to be substantially curved without damage, the process diagrammatically shown in Figure 3 may be employed, in which two large-size rollers 3, 4 are employed, over which a steel band 5 is caused to travel, said band being provided with outer fittings for the matrices 6 or the die. A further steel band 8 mounted inside the former is caused to travel on the same roller 3 and on a further roller 7, and carries on its outer face the matrices 6'. The matrices 6 and 6' are mounted in such manner that they register together when the two bands are wound in superposed relationship on the roller 3. Both bands are tensioned by means of springs 9 and 10 acting on the axis of the drums 7 and 4, respectively. The bands and associated matrices are heated before passing over the roller 3 on their path between rollers 4 and 3. Heating may be effected for instance by means of hot air heaters 11 and 12. In accordance with the materials treated the roller 3 is cooled or kept at a determined temperature suited to the particular material, so that at the end of impression, which is effected over all the angular travel by the roller 3 over which the bands are passed, the impressed disc issues at a temperature which is low enough to ensure durability of the sound track. It will be obvious that the pair of matrices of the die are secured to the steel band in such manner that they exactly register with each other when they are superposed for recording, which is effected on roller 3.

Operation is as follows: after setting in rotation the drum 3 which carries along at the same speed the stretched steel bands 8 and 5, and operating the heaters 11 and 12 and means for heating the roller 3 to the desired temperature, the record blanks of synthetic material manufactured by the device shown in Figure 1 are placed on the matrices, for instance on the inner elements 6' of the dies. The blanks are heated to the desired temperature together with the matrices by passing in front of the heaters. In the meantime, the matrices 6 and 6' are superposed clamping the record blanks and, between them, as the bands travel over the roller 3, the pressure due to the tension of the bands starts the impression. As the belt travels over the roller 3, the matrices and overlying blanks are heated to the temperature of the roller, and issue at the opposite end, where the two matrices are drawn apart, by reason of the difference in diameter of the rollers 4 to 7, and the impressed records are removed in a finished condition. By this method it is possible to obtain a very high output with a very low cost of installation and operation.

According to this invention, it is further possible to manufacture, instead of discs, rollers of synthetic material, suited for recording music or speeches of considerable length, which need then not be divided into a number of discs. The rollers may even be of considerable length, so that lengthy records may be impressed. It will be obvious that these records cannot be impressed by stamping but have to be directly impressed either by electrical or mechanical means.

The plastic material for manufacturing the rollers is produced by means of screw presses as described in our Italian Patent 370,578, in order to ensure greatest uniformity of structure without the use of solvents. Extrusion takes place through an annular slot delivering a tube which is cut to lengths as required for the rollers, that are thus directly obtained. The rollers made from the tube should be treated, before recording, with suitable solvents, in order to facilitate impression of their surface by softening their superficial layer, the record being made permanent by eliminating the solvent or other suitable means employed.

As it would not be convenient to prepare the roller every time recording has to be effected by softening its surface, according to this invention the roller is coated with suitable substances that maintain it in a condition for recording for a long period and which may be easily removed for use. These substances may be applied on a strip or ribbon which is helically wound on the roller, so that they exert their softening action on the superficial layer of the roller, this action lasting until the winding is removed. For impression, the ribbon is unwound and the roller may be recorded, the record being of a permanent nature as the softening agents are eliminated by removing the ribbon. When treating rollers obtained from a composition of cellulose acetate, their surface may be softened by using a composition of 30% alcohol at 95° with 40% methyl acetate and 30% acetone.

The above described method of impression may be utilised not only for rollers, but also for flat discs, by dipping the discs before recording into a composition of the type described or applying to the discs to be recorded a layer of fabric or the like impregnated with the above mentioned substances, so that the softening properties are preserved for a long time till recording is effected.

The disc shown in Figure 4 is made of two parts 13, 14 differing in colour, obtained from correspondingly coloured ribbons manufactured by the process according to Figure 1, having recesses in both faces corresponding in size to the label which is placed therein, whereupon a disc 18 corresponding in size, made from transparent material, is applied and may be provided with a sound record, the label being visible therethrough.

What I claim is:

An apparatus for making phonograph records comprising a driving roller and second roller of different diameters, means for actuating the driving roller of greater diameter, an endless steel band mounted on said driving and second rollers, means for tensioning said steel band, flexible matrices secured in a removable manner on said steel band, means for securing in a removable manner said flexible matrices to said steel band, a third roller greater in diameter than the smaller one of the first mentioned rollers, said roller having its shaft mounted in the same plane in which the shafts of the two previously mentioned rollers are mounted so that the second roller is situated between the first and third roller, a further steel band mounted on the driving roller and third roller, means for tensioning said last mentioned steel band, flexible matrices fixed in a removable manner to said last mentioned steel band and equalling in number the matrices fixed to the first mentioned steel band, means for securing in a removable manner said flexible matrices to said second mentioned steel band, said last mentioned matrices being set so as to cooperate with the first mentioned matrices on the driving roller, means for heating the blank placed on the matrices on the first mentioned steel band and means for cooling the driving roller.

ROBERTO COLOMBO.

(References on following page)

REFERENCES CITED

The following references are of record in the file of this patent:

UNITED STATES PATENTS

| Number | Name | Date |
|---|---|---|
| 739,421 | Johnson | Sept. 22, 1903 |
| 986,162 | Gare | Mar. 7, 1911 |
| 1,151,642 | Woods | Aug. 31, 1915 |
| 1,305,474 | Lewis | June 3, 1919 |
| 1,391,805 | Subers | Sept. 27, 1921 |
| 1,553,931 | Challenger | Sept. 15, 1925 |
| 1,641,136 | Dorn | Aug. 30, 1927 |
| 1,755,743 | Morrison | Apr. 22, 1930 |
| 1,985,993 | Herrmann et al. | Jan. 1, 1935 |
| 2,022,895 | Morrell | Dec. 3, 1935 |
| 2,069,589 | Meijling et al. | Feb. 2, 1937 |
| 2,216,946 | Hunter | Oct. 8, 1940 |
| 2,280,136 | Webster et al. | Apr. 21, 1942 |
| 2,442,443 | Swallow | June 1, 1948 |
| 2,446,771 | Knowland | Aug. 10, 1948 |

FOREIGN PATENTS

| Number | Country | Date |
|---|---|---|
| 324,534 | Great Britain | Jan. 30, 1930 |
| 124,508 | Australia | Sept. 25, 1931 |